US009588503B2

(12) United States Patent
Cooper et al.

(10) Patent No.: US 9,588,503 B2
(45) Date of Patent: Mar. 7, 2017

(54) ROUTING OF ENTERPRISE RESOURCE PLANNING MESSAGES

(71) Applicant: Rockwell Automation Technologies, Inc., Mayfield Heights, OH (US)

(72) Inventors: David Cooper, Cedar Park, TX (US); Kevin Chao, Mountain View, CA (US); Keith Chambers, Scott's Valley, CA (US); Richard Sze, Saratoga, CA (US); Crisler Moor, San Jose, CA (US); Brandon E. Henning, Palmyra, VA (US); Suryanarayana Murthy Bobba, Los Altos, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1081 days.

(21) Appl. No.: 13/676,998

(22) Filed: Nov. 14, 2012

(65) Prior Publication Data
US 2013/0123964 A1  May 16, 2013

Related U.S. Application Data

(60) Provisional application No. 61/560,218, filed on Nov. 15, 2011, provisional application No. 61/560,216, filed on Nov. 15, 2011.

(51) Int. Cl.
*G06F 3/00* (2006.01)
*G06F 5/00* (2006.01)
(Continued)

(52) U.S. Cl.
CPC ............ *G05B 13/00* (2013.01); *G06F 3/067* (2013.01); *G06F 3/0635* (2013.01); *G06Q 10/06* (2013.01); *G06F 13/4022* (2013.01)

(58) Field of Classification Search
None
See application file for complete search history.

(56) References Cited

U.S. PATENT DOCUMENTS

| 6,104,281 A | 8/2000 | Heinrich et al. |
| 6,615,199 B1 | 9/2003 | Bowman-Amuah |

(Continued)

FOREIGN PATENT DOCUMENTS

| EP | 1072967 A2 | 1/2001 |
| EP | 1906623 A1 | 4/2008 |

OTHER PUBLICATIONS

Office Action dated Jul. 8, 2015 for U.S. Appl. No. 13/677,019, 38 pages.

(Continued)

*Primary Examiner* — Henry Tsai
*Assistant Examiner* — Christopher Bartels
(74) *Attorney, Agent, or Firm* — Amin, Turocy & Watson, LLP

(57) ABSTRACT

An Enterprise Resource Planning (ERP) gateway is provided for routing of ERP messages to Manufacturing Execution System (MES) applications. The gateway can receive a message from an ERP system via a manufacturing services bus specifying a business objective requiring action at a control level of an enterprise. The received message can be routed to a selected MES application capable of carrying out the business objective based on attributes within the message. Message routing can be based on location tags contained in the message. The message can also be routed to a selected subset of MES applications based on an analysis of respective capabilities and control contexts of the MES applications. Messages can be routed between the ERP system and the MES applications via the manufacturing (Continued)

services bus, which can manage protocol transformations for a heterogeneous set of applications.

20 Claims, 11 Drawing Sheets

(51) Int. Cl.
*G05B 13/00* (2006.01)
*G06F 3/06* (2006.01)
*G06Q 10/06* (2012.01)
*G06F 13/40* (2006.01)

(56) References Cited

U.S. PATENT DOCUMENTS

| | | | |
|---|---|---|---|
| 7,317,959 | B2 | 1/2008 | Pfander et al. |
| 7,778,717 | B2 | 8/2010 | Bachman et al. |
| 7,934,252 | B2 | 4/2011 | Chung et al. |
| 7,974,723 | B2 | 7/2011 | Moyne et al. |
| 8,417,367 | B1* | 4/2013 | Logsdon ............... G06Q 10/06 700/100 |
| 8,452,810 | B2* | 5/2013 | Copello ............ G06F 17/30917 707/778 |
| 8,676,721 | B2* | 3/2014 | Piovesan ............... G06Q 10/00 706/11 |
| 2002/0138316 | A1* | 9/2002 | Katz et al. ........................ 705/7 |
| 2003/0149608 | A1 | 8/2003 | Kall et al. |
| 2004/0117358 | A1 | 6/2004 | von Kaenel et al. |
| 2005/0160412 | A1 | 7/2005 | Thurner |
| 2005/0267882 | A1 | 12/2005 | Aupperlee et al. |
| 2006/0106473 | A1 | 5/2006 | Enright et al. |
| 2008/0154412 | A1 | 6/2008 | Steinbach et al. |
| 2009/0043404 | A1 | 2/2009 | Moor et al. |
| 2009/0088871 | A1 | 4/2009 | Moor et al. |
| 2009/0276270 | A1 | 11/2009 | Karnataka |
| 2010/0191579 | A1 | 7/2010 | Sudarshan et al. |
| 2010/0205271 | A1 | 8/2010 | Callaghan |
| 2011/0258262 | A1* | 10/2011 | Bezdicek et al. ............. 709/206 |
| 2011/0258359 | A1* | 10/2011 | Bezdicek et al. ............. 710/306 |

OTHER PUBLICATIONS

Final Office Action dated Feb. 6, 2015 for U.S. Appl. No. 13/677,019, 36 pages.
Office Action dated Mar. 5, 2015 for U.S. Appl. No. 13/676,973, 44 pages.
Office Action dated Mar. 13, 2015 for U.S. Appl. No. 13/677,039, 250 pages.
Baina et al., "A Product Oriented Modelling Concept, Holons for Systems Synchronisation and Interoperability", Enterprise Information Systems, 8th International Conference, ICEIS 2006, May 27, 2006, selected papers, Springer, Berlin, Retrieved on Mar. 13, 2015, 8 pages.
OMAC Packaging Workgroup (ConnectPack). "Guidelines for Packaging Machinery Automation", version 3.1, release date May 11, 2006, Open Modular Architecture Controls, OMAC Users Group. Retrieved on Mar. 13, 2015, 135 pages.
Wybron, Inc. "Infogate User Manual", Model 4210CD Infogate software (Version 2.2), Model 4210 Infogate gateway, Manual issue date: Apr. 7, 2009. Retrieved on Mar. 13, 2015, 49 pages.
Giriraj, et al., "Layerless Manufacturing & SAP—Creating Responsive Shop Floor in the Supply Chain", International Journal of Engineering and Technology vol. 2(2), 2010, Retrieved on Mar. 13, 2015, 6 pages.
Burnham, "Using ISO/IEC 19770-2 Software Identification Tags to Enhance Software Asset Management", White Paper, Agnito Advisors, 2009. Retrieved on Mar. 13, 2015, 8 pages.
European Search Report for European Patent Application No. EP12192874 dated Feb. 6, 2013, 6 pages.
European Search Report for European Patent Application No. EP12192876 dated Feb. 6, 2013, 6 pages.
European Search Report for European Patent Application No. EP12192875 dated Apr. 3, 2013, 14 pages.
Mesa International. "MES Explained : A High Level Vision", White Paper No. 6, Sep. 1997, 25 pages.
Karnouskos, et al. "Integration of Legacy Devices in the Future SOA-Based Factory", Information Control Problems in Manufacturing, vol. 13, No. 1, Jun. 2009, 6 pages.
Jammes, et al. "Service-oriented architectures for devices—the SIRENA view", 2005 3rd IEEE International Conference on Industrial Informatics, Perth, Australia, Aug. 2005, 8 pages.
Feldhorst, et al. "Integration of a legacy automation system into a SOA for devices". IEEE Conference on Emerging Technologies & Factory Automation, Sep. 2009, 8 pages.
Office Action dated Sep. 24, 2014 for U.S. Appl. No. 13/677,019, 38 pages.
European Search Report for European Patent Application No. 12192874.1 dated Feb. 5, 2014, 6 pages.
Office Action for U.S. Appl. No. 13/676,973, dated Aug. 14, 2015, 39 pages.
Office Action for U.S. Appl. No. 13/677,039, dated Oct. 7, 2015, 35 pages.
Su, X., et al., "On the Identification Device Management and Data Capture via WinRFID 1 Edge-Server," IEEE Systems Journal, Dec. 2007, vol. 1, No. 2, pp. 95-104.
Grauer, M., et al., "An Approach for Real-Time Control of Enterprise Processes in Manufacturing using a Rule-Based System," MKWI 2010—Enterprise Resource Planning and Transformation von ERP-Systemen, pp. 1511-1522, Information Systems Institute, University of Siegen.
Office Action for U.S. Appl. No. 13/677,019, dated Nov. 3, 2015, 36 pages.
European Search Report for European Patent Application No. EP12192875 dated Apr. 21, 2016, 6 pages.
Office Action for U.S. Appl. No. 13/676,973, dated May 5, 2016, 44 pages.
Office Action dated Jun. 4, 2015 for European Application No. EP12192876.6-1955 7 pages.
Office Action for U.S. Appl. No. 13/677,039, dated Aug. 11, 2016, 30 pages.
Juels, A., "RFID Security and Privacy: A Research Survey," IEEE Journal on Selected Areas in Communications, Feb. 6, 2006, vol. 24, Issue 2 , pp. 381-394.
Notice of Allowance for U.S. Appl. No. 13/676,973, dated Sep. 6, 2016, 49 pages.

* cited by examiner

ROUTING OF ENTERPRISE RESOURCE PLANNING MESSAGES

RELATED APPLICATIONS

This application claims the benefit of U.S. Provisional Patent Application Ser. No. 61/560,218, filed on Nov. 15, 2011, and entitled "ROUTING OF ENTERPRISE RESOURCE PLANNING MESSAGES." This application also claims the benefit of U.S. Provisional Patent Application Ser. No. 61/560,216, filed on Nov. 15, 2011, and entitled "ROUTING OF ENTERPRISE RESOURCE PLANNING MESSAGES." The entireties of these applications are incorporated herein by reference.

TECHNICAL FIELD

The subject application relates generally to industrial control, and, more particularly, to a manufacturing services bus architecture for routing Enterprise Resource Planning (ERP) messages to selected Manufacturing Execution System (MES) applications.

BACKGROUND

Industrial controllers and their associated control programming are central to the operation of modern industrial automation systems. These controllers interact with field devices on the plant floor to carry out controlled processes relating to such objectives as manufacture of a product, material handling, batch processing, waste water treatment, and other such processes. Industrial controllers store and execute user-defined control programs to effect decision-making in connection with the controlled process. Such programs can include, but are not limited to, ladder logic, sequential function charts, function block diagrams, structured text, or other such platforms.

The various control systems that make up an enterprise are sometimes collectively managed by a Manufacturing Execution System (MES), which monitors real-time data from the plant floor and issues control management instructions in view of higher level business considerations, such as order management, resource management, inventory, scheduling, etc. In an enterprise comprising multiple production areas, or multiple geographically diverse facilities, the MES system may comprise multiple MES applications corresponding to the respective areas or facilities.

Plant floor operations, including control of industrial processes by the industrial controllers described above, represent one component of a larger business enterprise. On a higher level, business operations such as financial analysis, marketing, sales, order management, long term business planning, resource management, inventory management, and the like collectively represent another element of the enterprise. Many organizations employ an Enterprise Resource Planning (ERP) system or similar business system to correlate and manage these business level functions in a cohesive manner.

Although business level and plant floor level operations are related to and dependent upon one another, the two levels are often only loosely integrated, with slow (e.g., non-real-time, non-automated) information exchange between the two. Moreover, efforts to integrate higher level business systems with plant-side control can be hindered by the need for specialized programming code, necessitating involvement of experienced programmers or IT personnel who may have limited understanding of both the business-side and plant-side operations compared with management or factory personnel.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to the use of a gateway and bus architecture to route received ERP messages to one or more MES applications. To this end, a manufacturing services bus can provide a platform by which business-level requests, such as those generated by an ERP system, can be transformed and routed to selected MES applications (or other enterprise applications subscribed to the bus) to facilitate execution of the request at the control level. The manufacturing services bus can include an ERP gateway, which can receive and analyze the ERP request in view of current control contexts reported by the respective MES applications. The gateway can include an optimization algorithm that considers the contents of the ERP request together with the current control statuses reported by the MES applications (e.g., machine or facility statuses, energy or material constraints, work schedules, etc.), and determines a preferred set of one or more MES applications to which the ERP message is to be routed to best achieve the desired result given a specified set of decision criteria.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
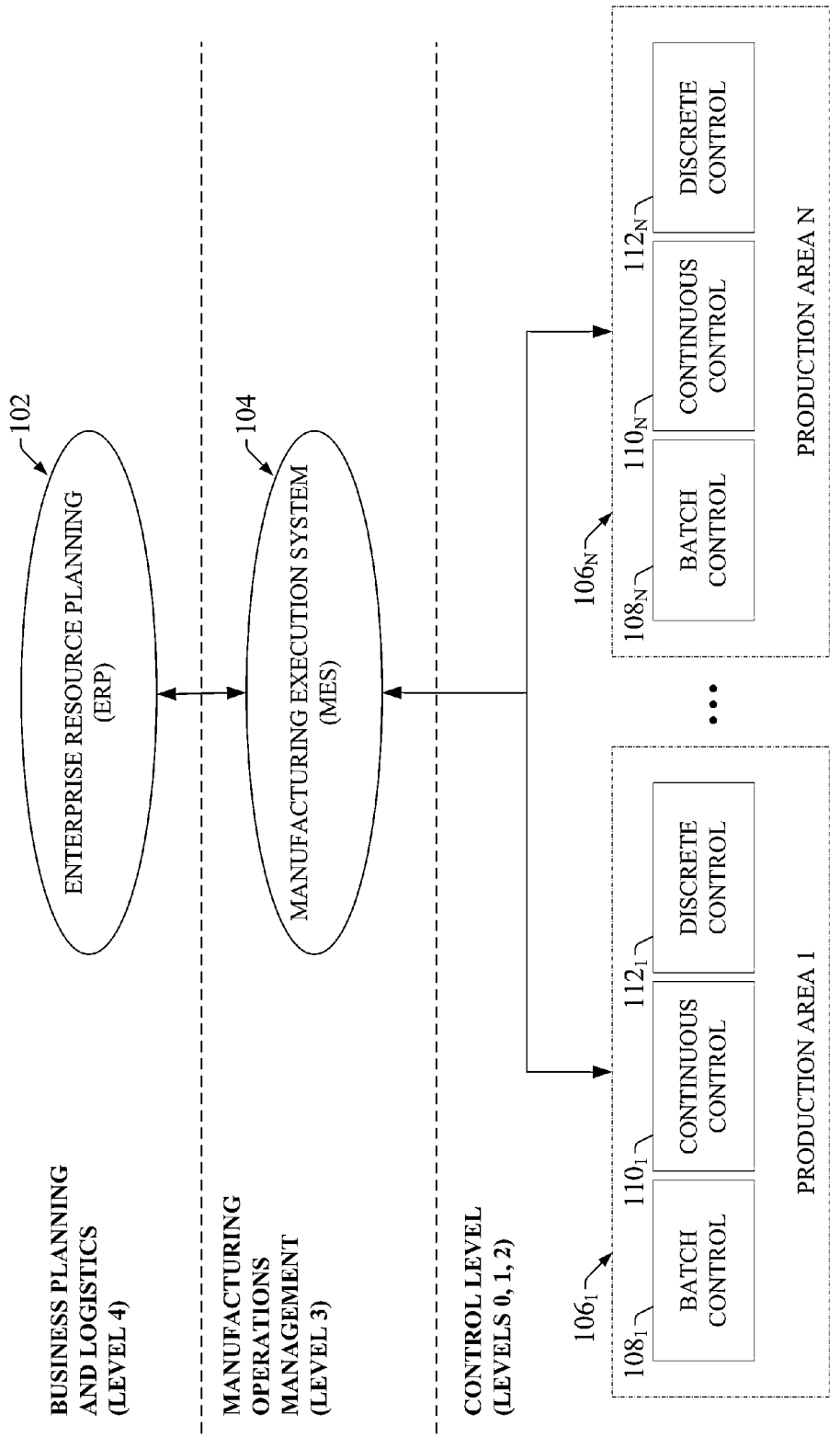
FIG. 1 is a high-level overview the relationships between an ERP system, an MES system, and control systems of an exemplary enterprise.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a high-level overview of the relationships between an ERP system 102, an MES system 104, and control systems 108, 110, and 112 of an exemplary enterprise. In accordance with ISA-95 definitions, these entities are depicted as residing, respectively, on a Business Planning and Logistics level (Level 4), a Manufacturing Operations Management level (Level 3), and a Control level (Levels 0-2). ERP system 102 can be used to integrate and collectively manage high-level business operations, such as finance, sales, order management, marketing, human resources, or other such business functions. ERP system 102 can serve as a high-level business planning tool that, stated broadly, is directed to longer-term business decision-making relative to operations at the control level, which generally focus on substantially real-time production concerns.

One or more control systems 108-112 can operate within respective production areas $106_1$-$106_N$ at the control level. Exemplary types of control systems can include, but are not limited to, batch control systems $108_{1-N}$ (e.g., mixing systems), continuous control systems $110_{1-N}$ (e.g., PID control systems), or discrete control systems $112_{1-N}$. These control systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motor control signals, and the like. The control program can comprise any conceivable type of code used to process input signals read into the controller and to control output signals generated by the controller, including but not limited to ladder logic, sequential function charts, function block diagrams, structured text, or other such platforms.

Manufacturing Execution System (MES) 104 can monitor and manage control operations on the control level given higher-level business considerations. An exemplary MES system can be provided with information relating one or more of scheduling, work order management and execution, business operating procedures, resource management, quality criteria, inventory management, and the like. Given this high-level business information, MES system 104 can monitor control systems 108, 110, and/or 112 and issue control management instructions designed to align operations at the control level with medium-term or long-term goals of the organization as a whole.

Production areas $106_1$-$106_N$ can represent different areas within a single plant, corresponding, for example, to different segments of a given manufacturing process, different products, etc. Alternatively or in addition, Production areas $106_1$-$106_N$ can represent facilities located at different geographical locations associated with a given enterprise. In such architectures, a central MES system 104 can monitor and manage multiple control systems at different geographically diverse facilities, providing coordination between the facilities in view of a common business objective.

While a single MES system 104 is illustrated in the overview of FIG. 1, it is to be appreciated that a given enterprise may comprise multiple MES systems. For example, an enterprise comprising multiple plant facilities may employ an MES system at each facility, where each MES system collectively manages the control systems that make up that system's facility. Since these different facilities collectively comprise the control level of a common enterprise, a single ERP system (or other business-level system) can execute collective business planning functions for the enterprise as a whole and dispatch business-driven requests to all the MES systems making up the enterprise. As will be discussed in more detail infra, the ERP gateway and manufacturing services bus architecture of the present disclosure can facilitate intelligent routing of ERP messages to the various MES applications.

Figure 2:
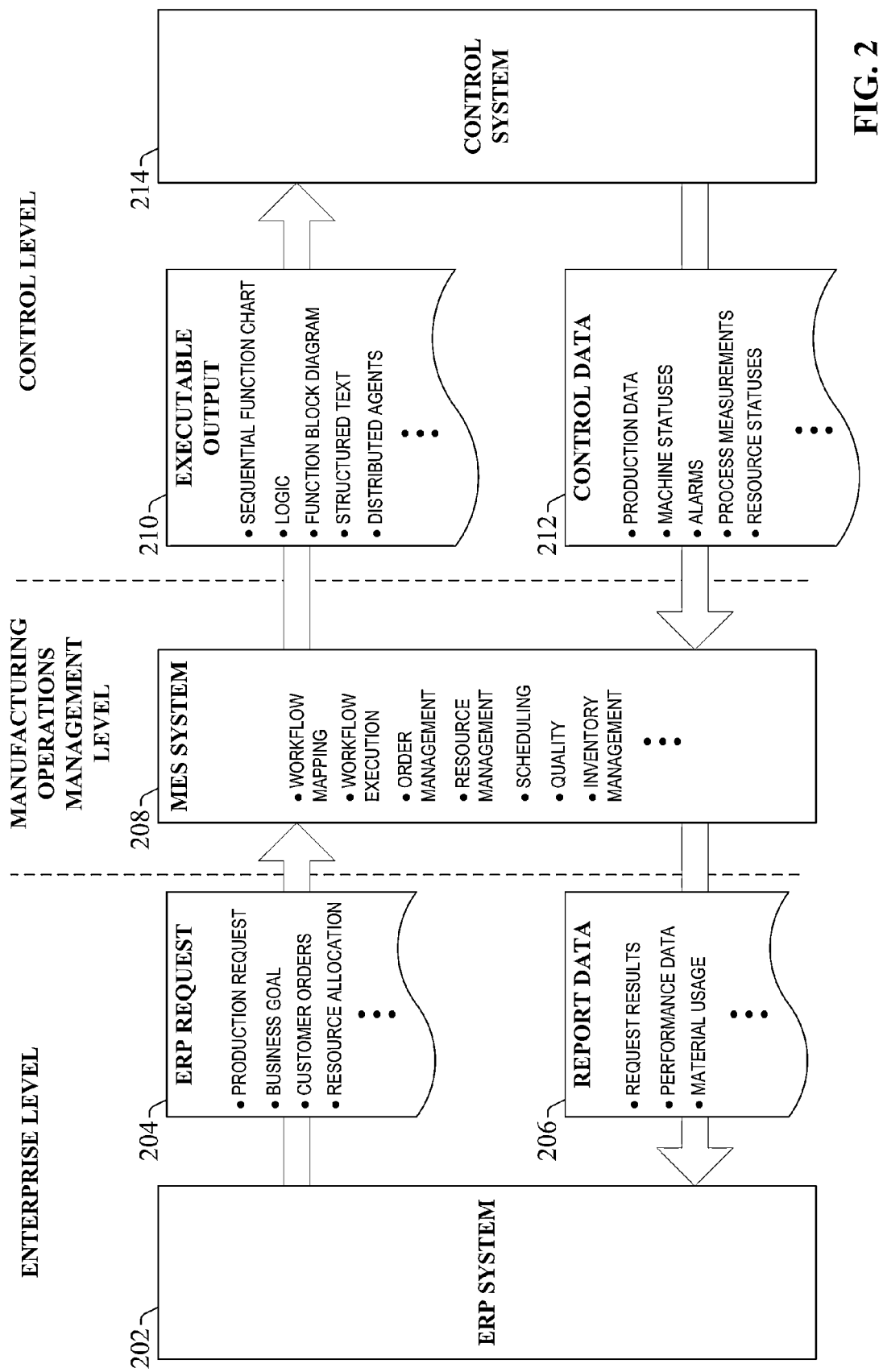
FIG. 2 is a block diagram of exemplary data flows between an ERP system, an MES system, and a control system.

FIG. 2 illustrates exemplary data flows between an ERP system, an MES system, and a control system according to one or more embodiments of the present disclosure. It is to be appreciated that control system 214 can comprise a single self-contained control system or multiple distributed control systems. Moreover, control system 214 can span multiple geographic locations, where individual control systems at the multiple locations report to a common MES system 208. Likewise, MES system 208 can comprise multiple MES applications that each collectively manage control systems at different areas of a facility, or at different facilities, as described above.

ERP system 202 (or a similar business system) can issue an ERP request 204 to MES system 208. Such requests can include, but are not limited to, production requests, business goals, customer order information, resource allocation requests, or other such requests. A production request can comprise, for example, a request from the ERP system to produce a specified quantity of a product. In such cases, ERP system 202 may not have knowledge of the particular control architecture or statuses of control system 214, machine availability, work schedules, or other plant floor variables involved in fulfilling the request. Given its ability to monitor and maintain these control-side factors, MES system can receive this production request from the ERP system 202 and determine one or more possible workflows for producing the desired amount of the indicated product based on an analysis of the overall control system architecture, machine availabilities, work schedules, or other plant floor variables involved in fulfilling the request. For example, the MES system can determine which machines are available and capable of producing the desired amount of the product, a suitable control strategy to be executed by the machines to satisfy the order (e.g., a batching sequence, a number of batches that must be run to produce the desired amount, etc.). The ERP can then transform a suitable workflow into an output executable by the control system to implement the workflow, using techniques to be described in more detail infra. Upon completion of (or during) the workflow, the MES system can provide the ERP system with report feedback at a desired level of granularity.

A business goal can comprise more a complicated request involving correlation of a plurality of factors. For example, the ERP system can issue a request to the MES system 208 to minimize energy consumption for the plant as a whole during a specified range of hours, while simultaneously maximizing production of an indicated product given the energy constraint. As with the production request, this request can be processed by MES system 208 and mapped to an appropriate control system workflow. Other exemplary ERP requests can include customer order requests, resource allocation requests, or any other business request generated by ERP system 202.

As noted above, MES system 208 can map incoming ERP request 204 to a suitable workflow for execution by the MES system. In connection with generating this workflow, MES system can identify machines or devices that can be leveraged to fulfill the business request, as well as their associated controllers. MES system 208 can then translate the workflow to an executable output 210 capable of execution by the identified controllers. This executable output 210 can comprise any suitable format understandable by the controllers, including, without limitation, sequential function charts, ladder logic, function block diagrams, structured text, distributed control agents, and the like. Executable output 210 can also comprise control output signals mapped to tags or other I/O associated with the controllers.

In addition to providing workflow instructions, MES system 208 can monitor and receive control data 212 from control system 214. Examples of such control data include production data, machine statuses, alarms, process measurements (e.g., telemetry values), resource statuses, or other data made available by control system 214. Among other uses, MES system 208 can employ this control data to update system models used to select suitable workflows. MES system 208 can also employ the control data 212 to generate report data 206 for provision to ERP system 202. Report data 206 can include result data relating to implementation of the ERP request 204, presented at a desired level of granularity. For example, ERP system 202 may only require an indication that a production request specified by ERP request 204 was fulfilled, but does not require details regarding the particular equipment used or number of production cycles run in connection with completing the request. Accordingly, MES system 208 can be configured to omit such production details from report data 206.

It is to be appreciated that any suitable communication protocol can be used to affect the data exchanges described above. For example, ERP requests can be received by the MES system 208 in Business to Manufacturing Markup Language (b2MML), which is an XML implementation of the ANSI/ISA 95 family of standards. However, other suitable communication formats and protocols are also contemplated and are within the scope of the present disclosure.

The foregoing is intended to provide a general overview of the relationships and types of data exchange between the ERP system, MES system, and control system. One or more embodiments of the present disclosure provide an ERP gateway configured to receive an ERP request (such as ERP request 204 of FIG. 2) and to route the request via a manufacturing services bus to one or more selected MES systems for execution. To this end, the ERP gateway can collect current control context information from the various MES systems subscribed to the bus. This control context information can include, for example, machine statuses and availability, facility or production line work schedules, resource inventory statuses, energy constraints at a given facility, process capabilities at the respective facilities or production lines, or other such control-level context information. The ERP gateway can then leverage an optimization algorithm to select one or more MES systems best suited to execute the ERP request based on the control contexts and information included in the ERP request. These aspects are discussed in more detail below.

Figure 3:
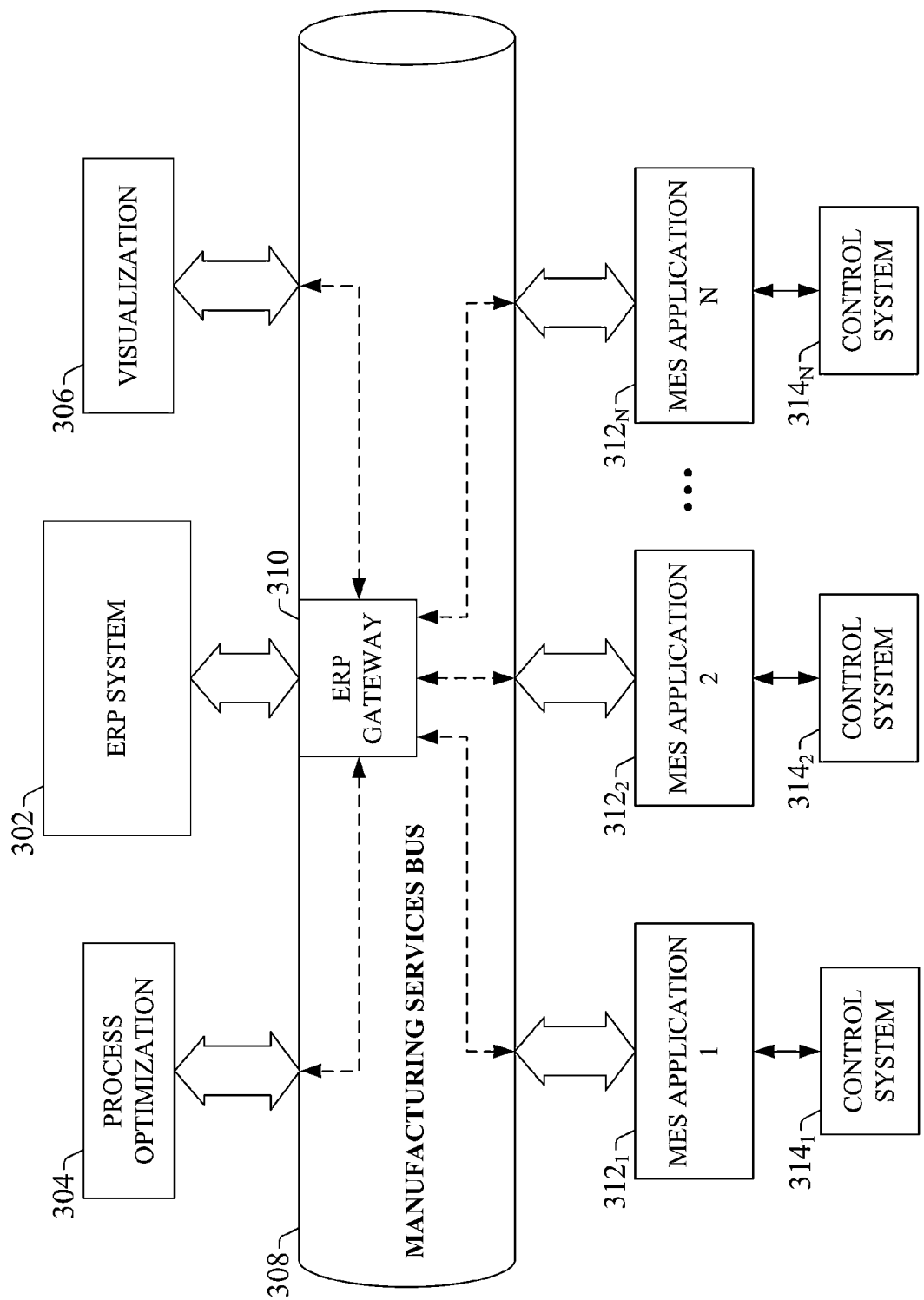
FIG. 3 illustrates an exemplary message transformation and delivery platform.

FIG. 3 illustrates an exemplary message transformation and delivery platform according to one or more embodiments of the present disclosure. A manufacturing services bus 308 is used to integrate ERP and MES systems under a flexible and intelligent message exchange architecture. In this exemplary overview, an ERP system 302 and multiple MES applications 312 are subscribed to the manufacturing services bus 308. Manufacturing services bus 308 can include integrated transformation and routing features that facilitate message exchange between the ERS system 302 and MES applications 312, even if the respective systems utilize different messaging formats and protocols. By configuring manufacturing services bus 308 to perform the message format transformations, a system subscribed to the bus can exchange messaging with other systems on the bus without being aware of the message formats utilized by the other systems. Also, manufacturing services bus 308 can be configured with rules that control how messages received at the bus are routed, as well as integrated security features to prevent routing of unauthorized messages.

MES applications 312 can respectively comprise MES systems corresponding to different manufacturing facilities of an enterprise, or different work areas within a single facility. Each MES application 312 can provide coordinated management of respective control systems 314. Each control system 314 can comprise multiple control systems of a given facility, under the collective management of an MES application 312. ERP system 302 (or a similar business system) integrates information from multiple departments of the enterprise (e.g., finance, sales, marketing, order processing, human resources, etc.) and performs enterprise resource planning functions for the enterprise as a whole based on this business-side information. One such function involves generation of business requests for distribution to the control level for execution. Exemplary business requests generated by ERP system 302 can include, but are not limited to, requests for a specified amount of an indicated product to be produced, a customer order to be filled, a business-driven constraint on plant operation (e.g., a request to minimize overall plant energy usage at specified peak hours of the week while maximizing output of a preferred product), or other such business-level objectives requiring altered operation at the control level.

To facilitate routing of messages from ERP system 302, the manufacturing services bus 308 can include an ERP gateway 310 configured to receive, transform, and route messages from ERP system 302. Upon receipt of an ERP message, ERP gateway 310 can determine a preferred set of one or more MES applications 312 for carrying out the business request encoded in the ERP message, perform any necessary format transformations in view of the destination applications, and route the message to the identified subset of MES applications 312 via manufacturing services bus 308. Upon receipt of the message, MES applications 312 execute necessary workflows for carrying out the request, including providing instructions to control systems 314 to facilitate execution of the request (as will be discussed in more detail infra). When the MES applications 312 have confirmed completion of the workflows (or upon completion of intermediate milestone steps during execution of the workflows), MES applications 312 can send report data back to the ERP gateway 310 via the manufacturing services bus 308. ERP gateway 310 can transform the received MES data to the format utilized by the ERP system and deliver the message.

As illustrated in FIG. 3, other applications can be subscribed to manufacturing services bus 308, including, but not limited to, process optimization application 304 and visualization application 306. Through their subscription to the manufacturing services bus 308, these applications can also receive messages from ERP gateway 310. For example, ERP gateway 310 can route business request messages to the visualization application 306 to be rendered in human-readable form for review by business-level or plant-level personnel. In the opposite direction, parameter or instruction data entered by a user at the visualization application 306 can be routed to ERP gateway 310 for entry in the ERP system 302. ERP gateway 310 can also transform and route ERP request messages to process optimization application 304, which can leverage neural networking and one or more process models to predict how one or more business-level or control-level variables will be impacted as a result of carrying out the ERP request. Other exemplary applications that can be subscribed to manufacturing services bus 308 can include, without limitation, data historians, reporting applications, human-machine interfaces (HMIs), and the like.

Figure 4:
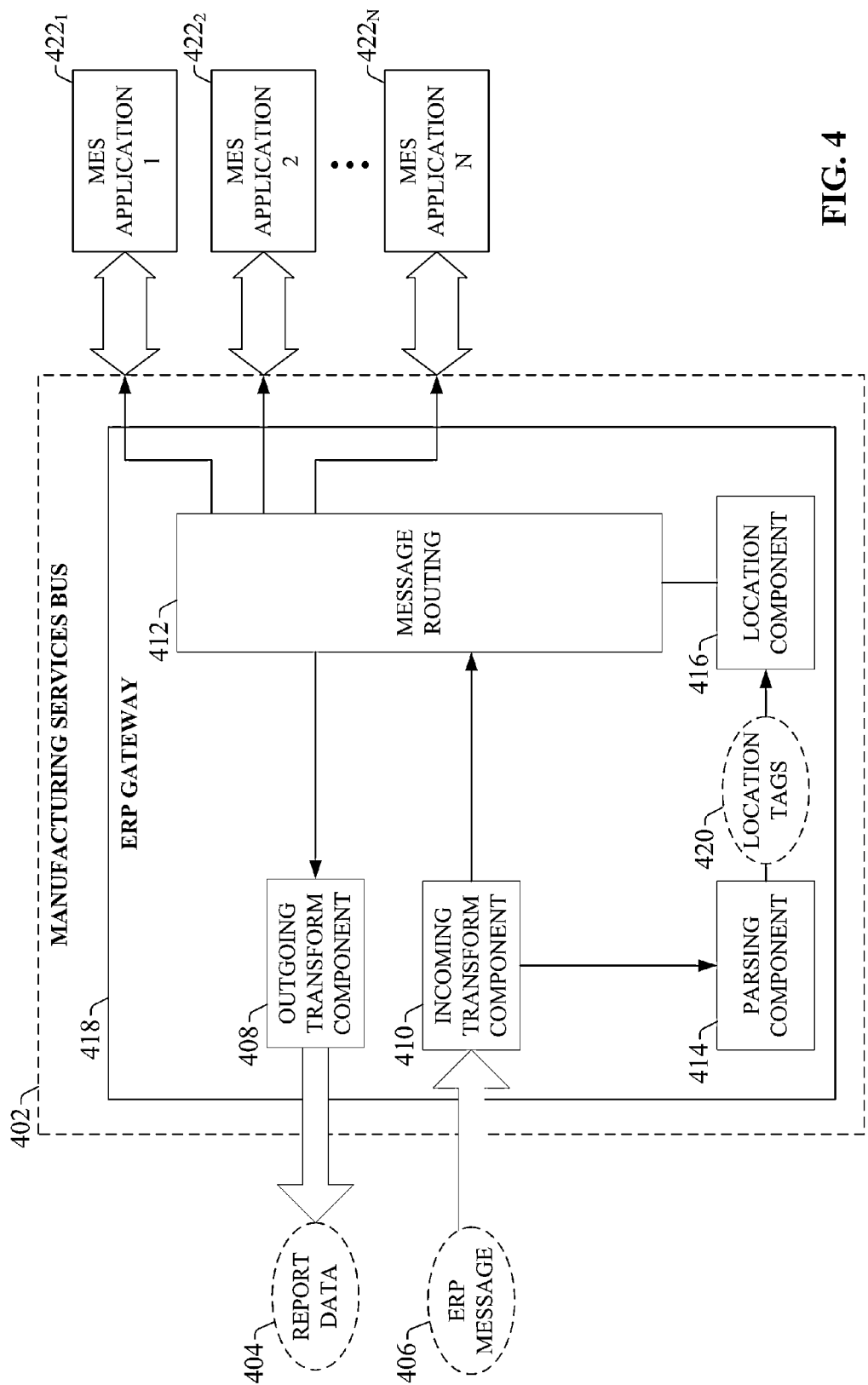
FIG. 4 illustrates message routing using an exemplary ERP gateway.

FIG. 4 illustrates message routing using an exemplary ERP gateway. Manufacturing services bus 402 can include ERP gateway 418 for routing messages between a business-level management system, such as an ERP system, and MES applications 422. Although ERP gateway 418 is depicted in this example as being integrated with the manufacturing services bus 402, it is also contemplated that ERP gateway 418 can be a separate entity that works in conjunction with manufacturing services bus 402 to facilitate ERP message routing. In this example, ERP message 406 is received at ERP gateway 418 from the ERP system via manufacturing services bus 402. ERP message 406 can comprise a business-driven request or objective generated by the ERP system, such as a production request, a customer order, a resource allocation request, an instruction to minimize plant energy consumption during indicated hours, specification of a product to be given manufacturing preference given a resource constraint, or other such requests.

Upon receipt of ERP message 406, ERP gateway 418 can pass the request to incoming transform component 410, which can convert a data format of the ERP message 406 to a format compatible with MES application(s) 422. For example, the ERP system from which ERP message 406 was received may be configured to send business requests in the form of B2MML (Business to Manufacturing Markup Language) messages, while one or more MES applications 422 may be configured to receive messages using Java Message Service (JMS). Accordingly, incoming transform component 410 can convert the B2MML message 406 for communication using JMS. Although B2MML and JMS are described in this example, it is to be appreciated that any suitable messaging format is within the scope of the present disclosure.

After transformation, the converted ERP message 406 is provided to message routing component 412 to be routed to one or more selected MES applications. In order to identify which MES applications 422 are to receive and process the ERP message, the ERP message is provided to a parsing component 414, which can parse the message to identify attributes within the message that can be leveraged to dynamically identify one or more destination MES applications 422. According to one or more embodiments, ERP message 406 can include one or more location tags 420 indicating which MES application 422 should receive the message for processing. These attribute tags can embedded into ERP message 406 by the ERP system when ERP message 406 is generated. Parsing component 414 can extract these location tags 420 and pass them to location component 416, which can identify the appropriate destination MES application based on data contained in the location tags 420.

In one or more embodiments, location tags 420 can specify the destination MES application explicitly. Alternatively, location tags 420 can indicate a particular control system, plant facility, production line, machine, or other plant-side element to be involved in executing the business objective specified in ERP message 406. In such cases, location component 416 can cross-reference the indicated control element specified by the location tag with the particular MES application 422 that manages the control element, and instruct the message routing component 412 to deliver the message to the identified application. In order to determine which MES application is responsible for managing the indicated control element, one or more embodiments of ERP gateway 418 can poll MES applications 422 directly to ascertain which application is responsible for managing the control element. Alternatively, ERP gateway 418 can maintain a lookup table that defines associations between location tags and MES applications, and location component 416 can access this lookup table upon receipt of the location tags 420 to identify the appropriate destination application. Once location component 416 has resolved the destination application based on the location tags 420, the location component can direct the message routing component 412 to route the message to the identified destination application.

In the reverse direction, MES applications 422 can send messages via manufacturing services bus 402 for delivery to the ERP system. These messages can comprise, for example, report data generated by the MES applications 422 in response to execution of a business goal defined in ERP message 406. Messages from MES applications 422 can be received by message routing component 412 of ERP gateway 418 and delivered to an outgoing transform component 408, which can convert a data structure of the outgoing message to a format compatible with the ERP system. For example, if an MES application 422 delivers a message using Java Message Service (JMS), outgoing transform component 408 can convert such messages to B2MML for delivery to the ERP system as report data 404.

Figure 5:
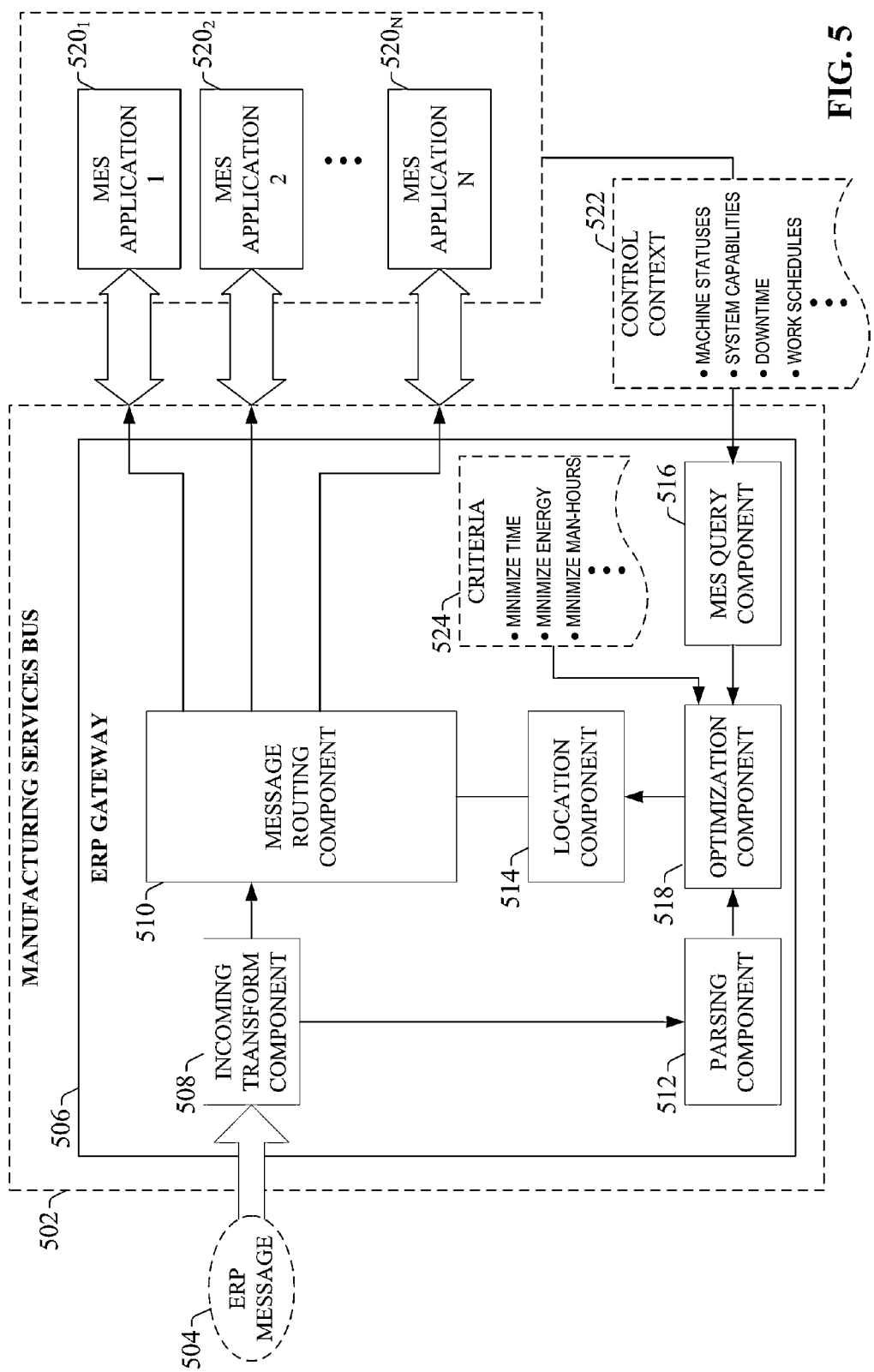
FIG. 5 illustrates an exemplary ERP gateway that that employs optimization to dynamically route ERP messages.

FIG. 5 illustrates an exemplary ERP gateway that that employs optimization to dynamically route ERP messages. As in previous examples, manufacturing services bus 502 can include or work in conjunction with an ERP gateway 506. ERP message 504 is received by ERP gateway 506 from a business system, such as an ERP system, over manufacturing services bus 502. The message is transformed into a format compatible with the MES applications 520 (e.g. JMS). The message is then routed to message routing component 510 for routing to a selected subset of MES applications 520 most suitable for carrying out the business request encoded in ERP message 504. In general, ERP gateway 506 seeks to identify which MES application (or set of applications) is capable of carrying out the business request in a preferred manner given current control conditions, a criterion included in the ERP message 504 or defined in ERP gateway 506, or other suitable decision factors.

To these ends, message routing component 510 can route incoming messages in accordance with instructions provide by an associated location component, which identifies applications to be leveraged for execution of the business objective specified by ERP message 504 based on a number of factors to be explained in more detail below. ERP message 504 is passed to parsing component 512 (either directly upon receipt of the message, or after translation into a suitable data format by incoming transform component 508). The parsing component 512 can analyze the message to identify the business request encoded in the message and any parameters or criteria associated therewith. For example, if the business request of ERP message 504 is a customer order for a defined quantity of a specified product, parsing component 512 can identify the specified product, the quantity, and any timeframe information included in the request (e.g., a deadline to fulfill the order). In another example, if the business request is a mandate that production of a specified product is to be given production priority given a defined energy constraint during peak energy hours, parsing component 512 can break down the request to identify the preferred product to be optimized, the energy constraint (e.g., the maximum desired energy consumption for the plant as a whole), and the hours for which the energy constraint is to be in effect. Parsing component 512 can also identify any location tags encoded within the message if such tags are present.

These identified elements of the business request can then be passed to an optimization component 518 for correlation with a number of additional factors to facilitate selection of MES applications best suited to carry out the business request. In one or more embodiments, optimization component 518 can leverage substantially real-time control context information 522 provided by the MES applications 520. This context information 522 can comprise information regarding the capabilities, architecture, and statuses of the control systems associated with the respective MES applications 520. Exemplary control context information 522 can include, but are not limited to, machine statuses, capabilities of the respective control systems, or unexpected or planned machine downtimes. This context information 522 can be retrieved from the MES applications 520 by an MES query component 516, which can query the MES applications 520 for the desired information and provide the control contexts to the optimization component 518 for correlation with the business request parameters generated by the parsing component 512.

Optimization component 518 can comprise an algorithm configured to correlate the business request parameters with the current control context information 522 provided by the MES applications 520 to identify a subset of MES applications 520 best capable of satisfying the business request defined in ERP message 504. In one or more embodiments, optimization component 518 can make this selection in accordance with one or more defined criteria 524. An exemplary criterion can include, for example, a stipulation that the subset of MES applications 520 should be selected to achieve the business objective in the least amount of time. When guided by such a criterion, optimization component 518 may determine that multiple combinations of MES applications (and associated control systems) are capable of satisfying the business objective, and will select the combination identified as being capable of satisfying the objective in the least amount of time. In another example, criterion 524 can stipulate that minimization of energy consumption should be the overriding selection factor. Accordingly, the combination of MES applications 520 capable of achieving the business goal with the least consumption of energy will be selected from the multiple possible combinations by the optimization component. Other exemplary criteria can include, without limitation, minimization of man-hours, minimization of material cost, smallest impact on production of a specified product, or other suitable criteria.

These criteria 524 can be generated by the ERP system as part of the business objective and included in ERP message 504. Alternatively, criteria 524 can be configured as one or more rules defined on the ERP gateway 506. In such embodiments, ERP gateway 506 can be configured to process all incoming ERP messages in view of the selection criteria 524. Moreover, one or more embodiments of ERP gateway 506 can dynamically select a criterion from a set of criteria 524 based on information included in the ERP message 504, such as a category of business request, a criterion selection field, metadata associated with the message, or other such information. One or more embodiments of ERP gateway 506 can also allow different criteria to be associated with different times of day or days of the week, such that the criteria considered by the optimization component is a function of the time at which ERP message 504 is received. For example, in order to control energy costs by shaving peak energy demand, a user may desire that all control-level activities be subservient to the goal of minimizing energy usage during specified peak demand hours. Accordingly, optimization component 518 can be configured to employ "minimize energy consumption" as the criterion for MES application selection during peak demand hours, and to employ "minimize time" as the criterion at all other times. In this way, ERP messages can be automatically routed to suitable MES applications according to dynamically changing criteria in accordance with business preferences.

Based on one or more of information contained in the ERP message 504, context information 522, and criteria 524, optimization component 518 can identify a subset of MES applications 520 best capable of satisfying the business goal defined by ERP message 504 while simultaneously satisfying criteria 524. These results can be passed to the location component 514, which can instruct message routing component 510 to route the message to the one or more MES applications identified by the optimization component.

Although the preceding examples have been described in terms of communication of ERP data to one or more MES applications, it is to be appreciated that ERP data can be routed to any type of application subscribed to manufacturing services bus 502, including visualization applications, process optimization applications, data historians, reporting systems, and the like. As noted above, the manufacturing services bus can be configured to perform the necessary data format conversions to facilitate message exchange between a range of heterogeneous applications.

Figure 6:
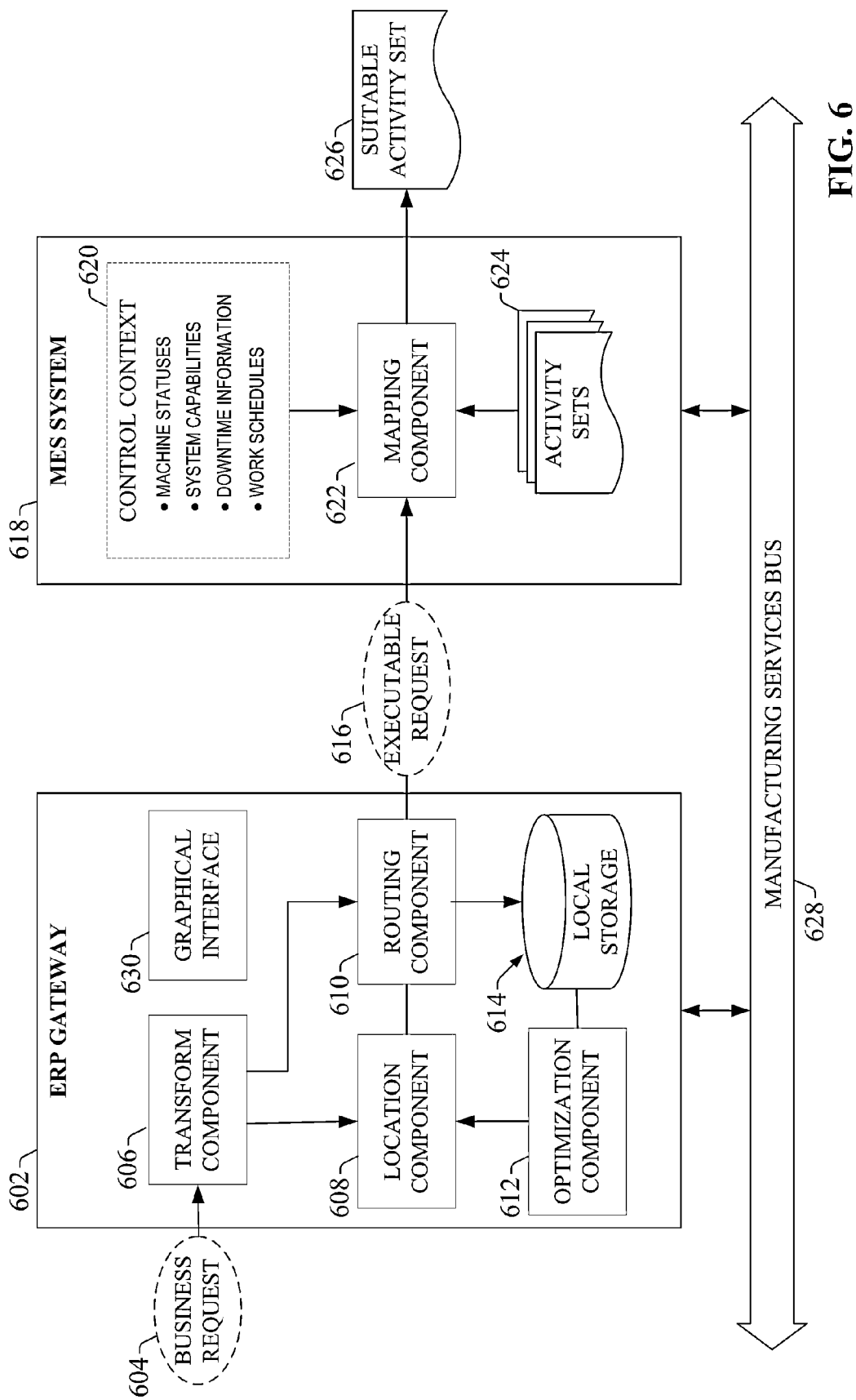
FIG. 6 illustrates an exemplary messaging scenario between an ERP system and an MES system via an ERP gateway.

FIG. 6 illustrates an exemplary messaging scenario between an ERP system and an MES system via an ERP gateway according to one or more embodiments of the present disclosure. In the present example, business request 604 is received at the ERP gateway 602. The business request 604 can be received, for example, from an ERP system or other high-level business management system as a b2MML message via a manufacturing services bus 628. Business request 604 can represent, for example, a production request from the business level of the enterprise, a customer order to be fulfilled, a schedule of plant operations, a set of business constraints that require modification of plant operation, or other such requests originating at the business level and affecting the control level of the enterprise.

The ERP gateway 602 can provide a flexible mechanism for interfacing MES system 618 with substantially any type of business system for exchange of business and production information. The ERP gateway 602 can manage format transformation and routing of the business request 604 to the MES system 618 to be mapped to one or more suitable activity sets.

To facilitate flexible configuration of the MES system for operation with a range of ERP or other business systems, ERP gateway 602 can be configured prior to deployment for compatibility with a specific business system in use. An associated graphical interface 630 can guide a developer through this configuration process. In one or more embodiments, ERP gateway 602 can be pre-bundled with selectable configurations corresponding to common existing ERP or other business systems. Graphical interface 630 can also allow selection of an expected data format (e.g., b2MML) in which data is to be exchanged between the MES system and the ERP system. During runtime, business request 604 can be received by the configured ERP gateway 602, and transformed by an associated transform component 606 from a data format used by the ERP system (e.g., B2MML) to a format understandable by MES system 618. In one or more embodiments, the transform component 606 can convert the business request 604 for communication to the MES system 618 using Java Message Service (JMS), although any suitable messaging format is within the scope of the present disclosure.

The transformed business request can pass the transformed business request 604 to routing component 610 or routing to the MES system 618. The target MES application is determined by location component 608 based in part on contents of the business request (e.g., parameters identified within the request, location tags embedded in the request message, etc.). Location component 608 can also determine a destination MES application based in part on an analysis by optimization component 612, which can correlate one or more of the request contents, current control context reported by one or more MES applications, or one or more selection criteria provided in the request or preconfigured in the gateway configuration. Upon resolution of a destination MES system 618, location component 608 can instruct routing component 610 to send the resulting executable request 616 to the identified application via manufacturing services bus 628. Details of the business request can be archived in local storage 614 associated with ERP gateway 602. The archived business request information can be viewed graphical interface 630 for later review, or accessed by optimization component 612 as criteria for routing future messages.

Executable request 616 can be passed to a mapping component 622 of the MES system, which analyzes the request in view of the current control context 620 of the plant in order to match a subset of activity sets 624 with the request 616. An activity set can define a series of activities or a workflow for achieving a particular business goal. The activity set can define the activities in terms of the control or business functions to be performed, the order of operation for the steps, the designated machines or devices required to perform each step, or any other information required to fully define the control activity represented by the activity set. The scope of a given activity set can be limited to a single device, or can encompass multiple machines coordinated by the MES system to perform a distributed control operation in response to a received business request. The workflow defined by an activity set can encompass both control-level activities and higher business-level activities acting in conjunction, thereby coordinating all levels of the enterprise to the end of satisfying the defined business goal. To this end, in addition to control operations, the activity sets can define interactions to be performed between the MES system and the ERP system relative to the defined sequence of control instructions. For example, it may be desired to provide validation feedback to the ERP system when a particular step of the control sequence associated with the activity set has been completed, or to provide an error message to the ERP system if a particular step of the control sequence fails or times out. Such feedback steps can be encoded in the activity set together with the control sequence activities. MES system 618 can include a library of generalized industry-specific activity sets, which can be bound to a user's particular control context via controller tag mapping during initial configuration.

Activity sets 624 can comprise customized activity sets that have been bound to selected controller tags of the control system. Based on the content of executable request 616 and the control context 620, mapping component 622 can select a suitable activity set 626 capable of satisfying the business request represented by executable request 616. Control context 620 can include such pre-configured or substantially real-time information as machine statuses and availability, the architecture and capabilities of the control system, current machine or system downtime information, work schedules, or other information relevant to execution of the business request. Control context 620 can be provided manually by a user or generated automatically based on real-time monitoring of the control system by the MES system 618.

As an example of how control context 620 can be used to facilitate selection of an activity set, consider a business request representing a customer order for a specified quantity of a selected product. In this example, the order is received from an ERP system as business request 604 and routed to MES system 618 by ERP gateway 602. Since the ERP system has no knowledge of the particular control context on the plant floor for fulfilling this request, the request includes no indication of which particular machines or process lines are to be used to satisfy the order. Upon receiving executable request 716 corresponding to business request 604, mapping component 622 can leverage the control context 620 to identify machines capable of fulfilling the request, the process that must be executed on these machines to produce the desired quantity of the product, and the current status and availability of the respective machines. Based on this information, mapping component 622 can select an activity set 626 corresponding to the identified process for execution on the identified machines. In some cases, the stored activity sets 624 may include different activity sets corresponding to the same process, but intended for execution on different machines (e.g., two different mixers having different control characteristics). If the different machines are capable of producing the ordered product, mapping component 622 can leverage control context 620 to determine a preferred machine on which to execute the order based on efficiency, respective machine availabilities, maintenance cycles, load balancing, or other such considerations made available by control context 620. In another example, the same activity set may be executable on different machines. Therefore, rather than selecting an activity set corresponding to a preferred machine, MES system 618 can select the activity set common to the different machines and select a target machine for the activity set based on the control context 620. Moreover, since a product quantity is associated with the customer order, this product quantity information can be passed from the executable request to the selected activity set as a variable, since the selected activity set may be generalized in terms of product quantity.

Figure 7:
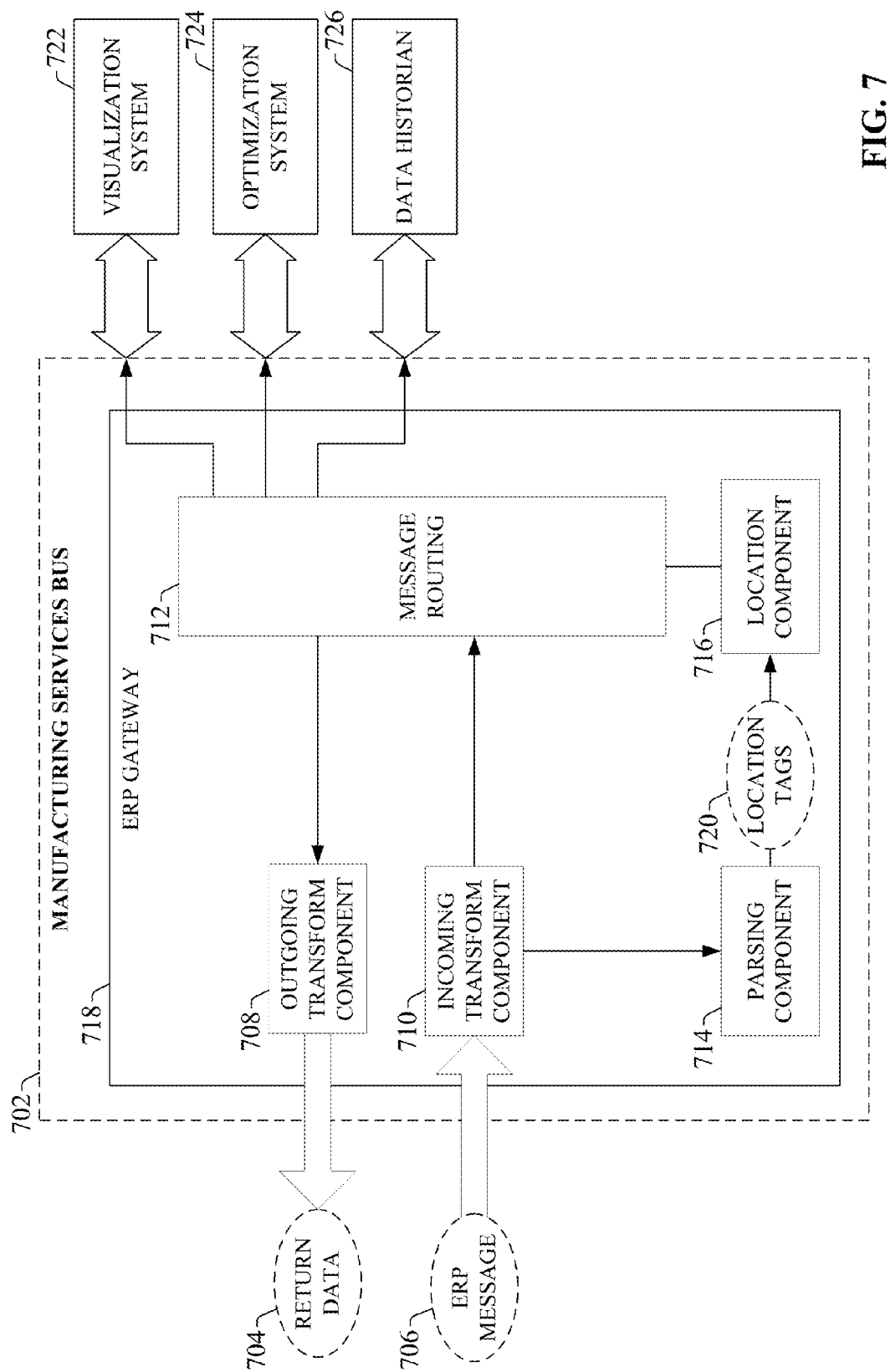
FIG. 7 illustrates message routing between an ERP system and multiple heterogeneous systems via a manufacturing services bus.

FIG. 7 illustrates message routing to a visualization system, an optimization system, and a data historian using an exemplary ERP gateway. In addition to MES applications, ERP gateway 718 is capable of routing messages to other diverse types of systems that utilize different data messaging formats. For example a visualization system 722, an optimization 724, and a data historian 726 can be subscribed to manufacturing services bus 702. Each application 722, 724, and 726 can utilize a different messaging format for sending and receiving messages (e.g., B2MML, JMS, etc.). The bus 702 can include an ERP gateway 718 for transforming and routing messages from a business system (e.g., an ERP system) to the respective applications 722, 724, and 726.

In this example, ERP message 706 is received at gateway 718 from the ERP system via bus 702. Although an ERP message is depicted in this example, message 706 can also comprise a message from another business-level or control-level application subscribed to bus 702. ERP message 706 can comprise a business-driven request or objective generated by the ERP system, such as a production request, a customer order, a resource allocation request, an instruction to minimize plant energy consumption during indicated hours, specification of a product to be given manufacturing preference given a resource constraint, or other such requests.

Visualization system 722 may wish to subscribe to receive the ERP message in order to render the message on a display screen. For example, visualization system 722 may be configured to receive ERP messages and render them in a graphical form for review by management or plant personnel. Optimization system 724 may be configured to leverage neural networking and one or more process models to predict how one or more business-level or control-level variables will be impacted as a result of carrying out the ERP request encoded in the message. Data historian 726 may be configured to archive a history of ERP request and associated report data, and is therefore subscribed to manufacturing services bus to receive the ERP messages.

Upon receipt of ERP message 706, gateway 718 can pass the request to incoming transform component 710, which can convert the message to a format compatible with one of the visualization system 722, the optimization system 724, or the data historian 726. For example, the ERP system from which ERP message 406 was received may be configured to send business requests in the form of B2MML (Business to Manufacturing Markup Language) messages, while one or more of applications 722, 721, and 726 may be configured to receive messages using Java Message Service (JMS). Accordingly, incoming transform component 710 can convert the B2MML message 706 for communication using JMS. Although B2MML and JMS are described in this example, it is to be appreciated that any suitable messaging format is within the scope of the present disclosure.

After transformation, the converted ERP message 706 is provided to message routing component 712 to be routed to one or more selected applications. In order to identify which applications are to receive and process the ERP message, the ERP message is provided to a parsing component 714, which can parse the message to identify attributes within the message that can be leveraged to dynamically identify one or more destination applications. As in previous examples, ERP message 706 can include one or more location tags 720 indicating which MES applications should receive the message for processing. These attribute tags can embedded into message 706 by the ERP system when the message 706 is generated. Parsing component 714 can extract these location tags 720 and pass them to location component 716, which can identify the appropriate destination applications based on data contained in the location tags 720.

In the reverse direction, applications 722, 724, and 726 can send messages via bus 702 for delivery to the ERP system. These messages can comprise, for example, user input data from the visualization system 722, optimization recommendations generated by the optimization system 724, or data being retrieved from data historian 726. Messages from applications subscribed to the bus can be received by the routing component 712 of gateway 718 and delivered to an outgoing transform component 708, which can convert a data structure of the outgoing message to a format compatible with the ERP system (or other destination system). For example, if an application delivers a message using Java Message Service (JMS), outgoing transform component 708 can convert such messages to B2MML for delivery to the ERP system as return data 704.

Figure 8:
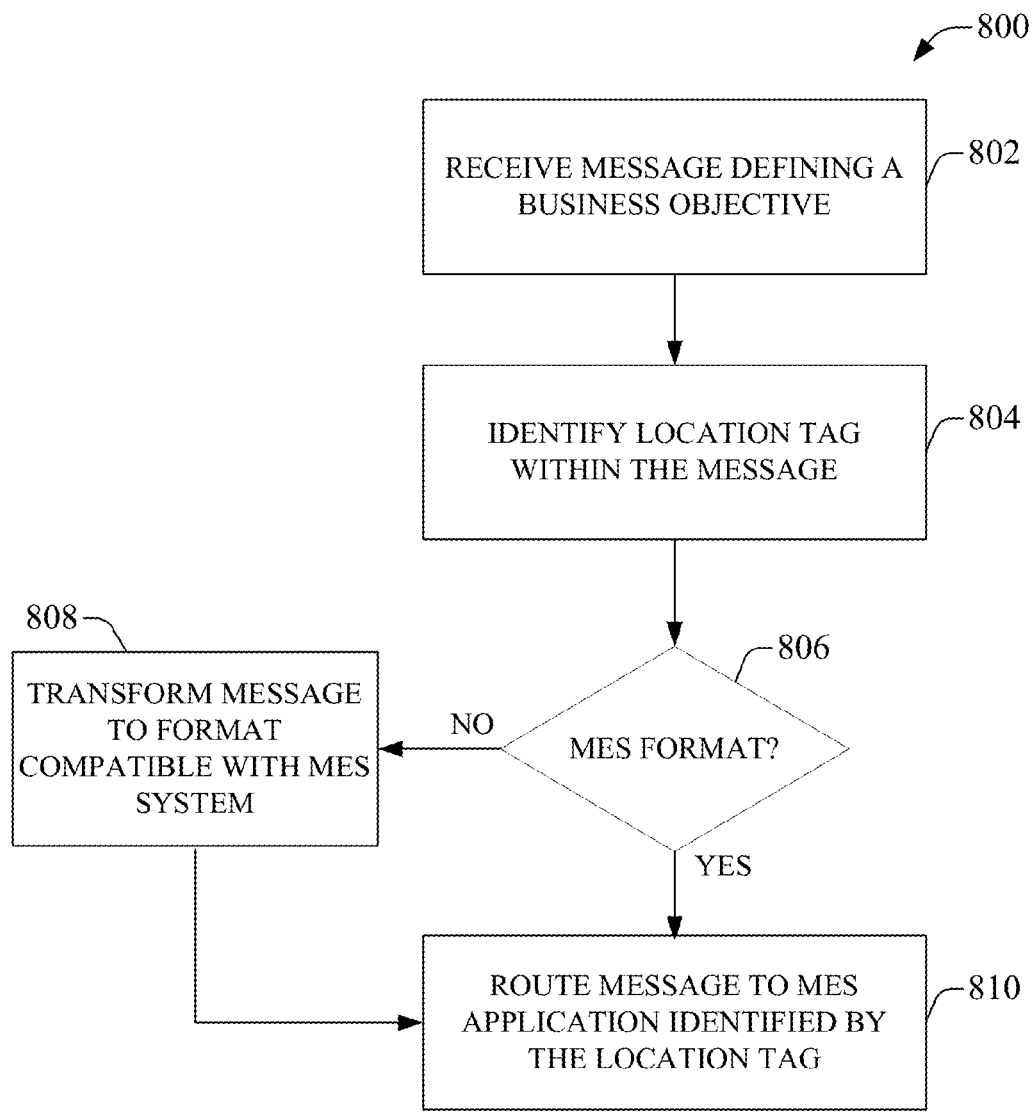
FIG. 8 is a flowchart of an example methodology for routing an ERP message to an MES application.
Figure 9:
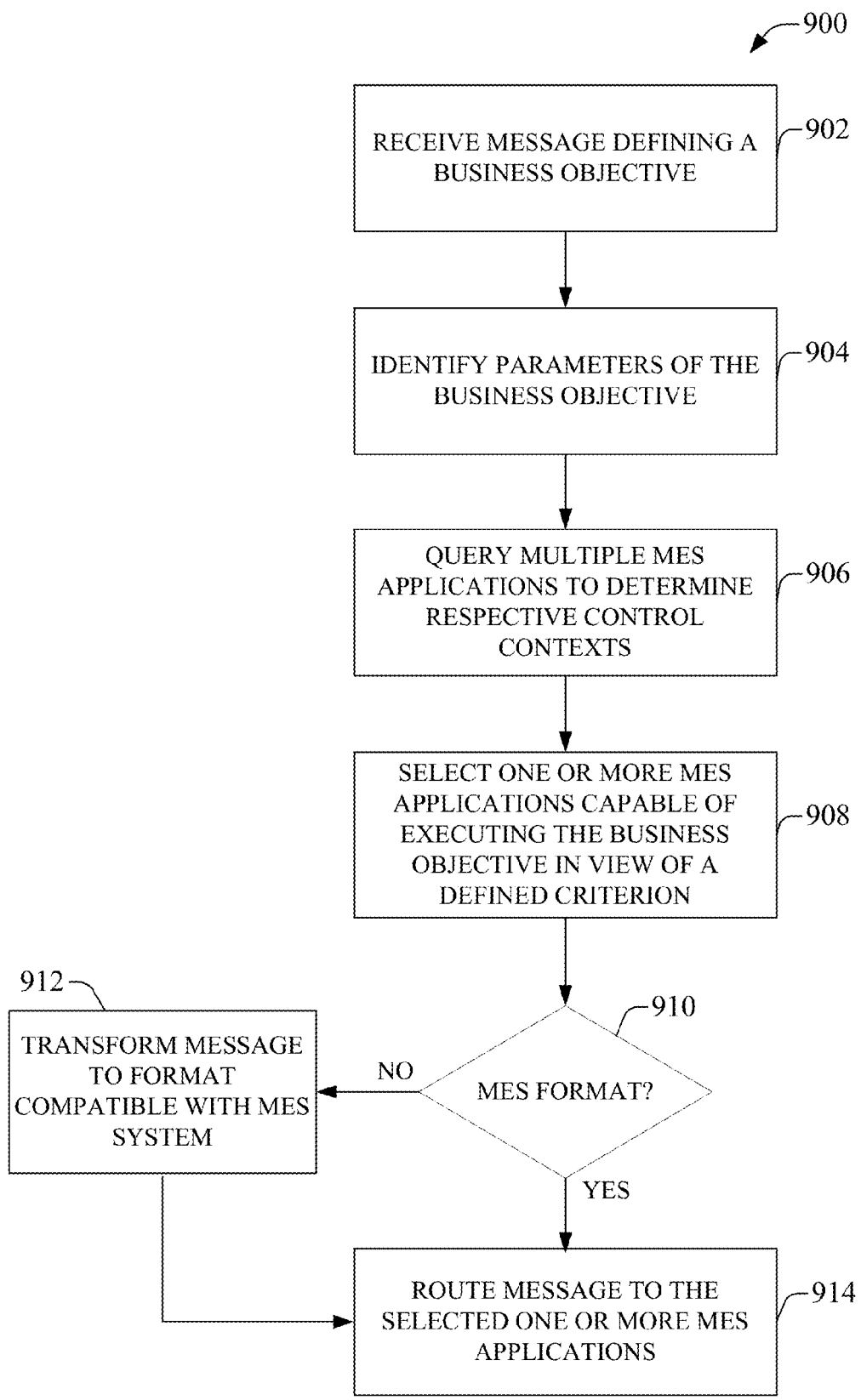
FIG. 9 is a flowchart of an example methodology for routing a message based on a current control context.

FIGS. 8-9 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 8 illustrates an example methodology 800 for routing an ERP message to an MES application. At 802, a message defining a business objective is received. In one or more embodiments, the message can be received from an ERP system or other planning system residing at a business level of an enterprise. The business objective can comprise, for example, a production request, a financial goal, a customer order to be fulfilled, resource allocation requests, or other such requests requiring action at a plant-floor level. At 804, a location tag within the message can be identified. The location tag can specify, for example, an MES system corresponding to a particular plant facility to which the message is to be directed. Alternatively, the message can identify the facility itself, one or more production areas within a facility, an application within the facility, or other such destination information. In such cases, the MES system corresponding to the location identified by the location tag can be identified.

At 806, it is determined whether the message is in a format compatible with the MES system to receive the message. If not, the message is transformed to a format compatible with the MES system at 808. For example, message can be converted from b2MML format to a format compatible with JMS (Java Message Service) for transfer of the message to the MES system. In one or more embodiments, this transformation can be performed by an ERP gateway prior to delivery to the MES system. At 810 the message is routed to the identified MES application. In one or more embodiments, the message can be routed via a manufacturing services bus to which the MES application is subscribed.

FIG. 9 illustrates an example methodology 900 for routing a message based on a current control context. At 902, a message is received defining a business objective. As in previous examples, the message can be received from an ERP system. At 904, parameters of the business objective are identified in the message. For example, if the business objective is a customer order for a defined quantity of a specified product, parameters identified can include the specified product, the quantity, and any timeframe information included in the request (e.g., a deadline to fulfill the order). In another example, if the business objective is a mandate that production of a specified product is to be given production priority given a defined energy constraint during peak energy hours, the parameters can include the preferred product to be optimized, the energy constraint (e.g., the maximum desired energy consumption for the plant as a whole), and the hours for which the energy constraint is to be in effect.

At 906, multiple MES applications are queried in order to determine control contexts associated with the respective applications. This control context information can include, for example, machine statuses and availability, facility or production line work schedules, resource inventory statuses, energy constraints at a given facility, process capabilities at the respective facilities or production lines, or other such control-level context information. At 908, one or more MES applications capable of satisfying the business objective are selected in view of a defined criterion. The defined criterion can include, for example, a request to satisfy the business objective by the most energy efficient means, by the fastest means, etc.

At 910, a determination is made regarding whether the message is in a format compatible with the selected one or more MES applications. If not, the message is transformed to s suitable format at 912. At 914, the message is routed to the one or more selected MES applications.

Embodiments, systems, and components described herein, as well as industrial control systems and industrial automation environments in which various aspects set forth in the subject specification can be carried out, can include computer or network components such as servers, clients, programmable logic controllers (PLCs), communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC as used herein can include functionality that can be shared across multiple components, systems, and/or networks. As an example, one or more PLCs can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 10:
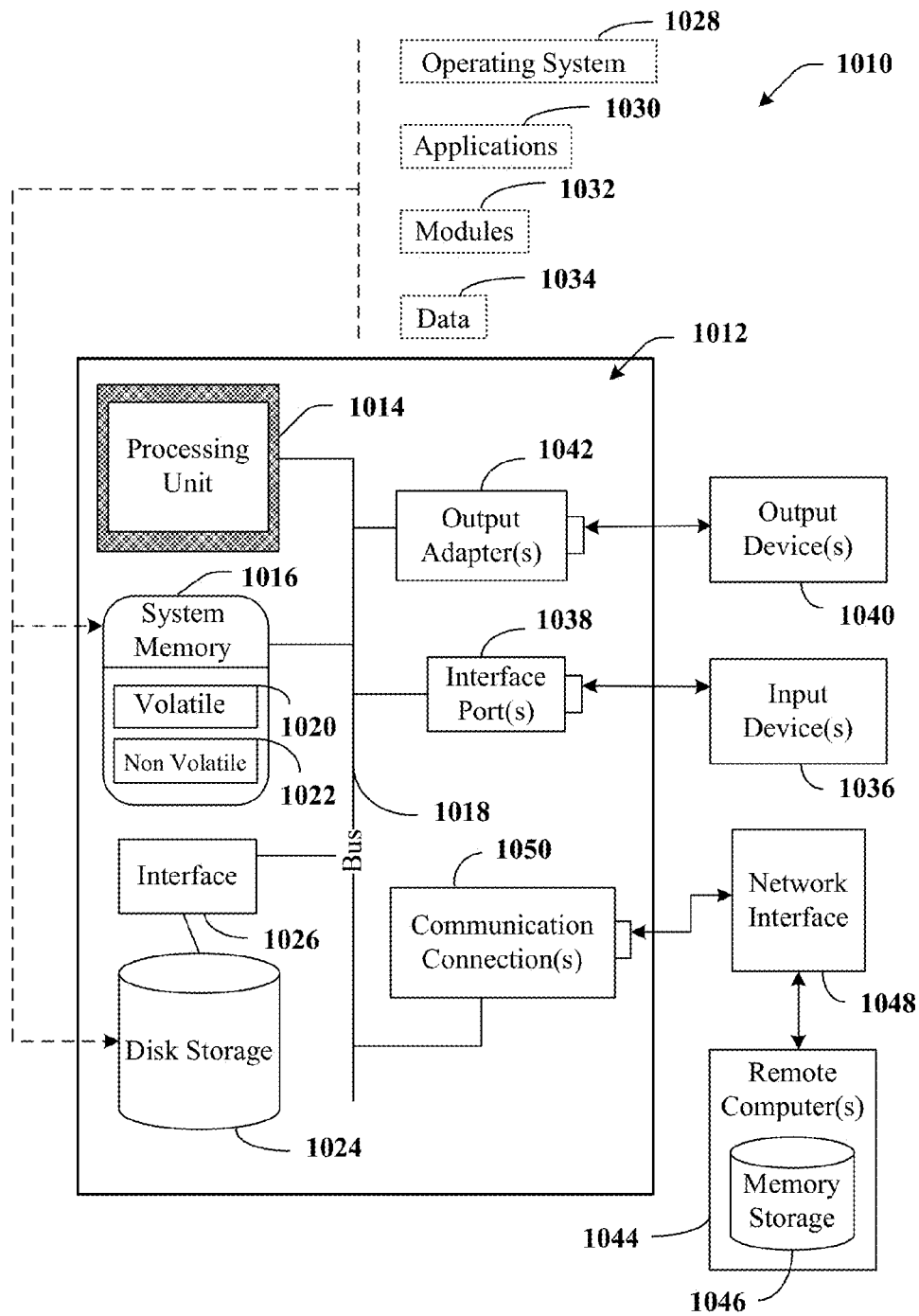
FIG. 10 is an example computing environment.

With reference to FIG. 10, an example operating environment 1010 for implementing various aspects of the aforementioned subject matter includes a computer 1012. The computer 1012 includes a processing unit 1014, a system memory 1016, and a system bus 1018. The system bus 918 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable PROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
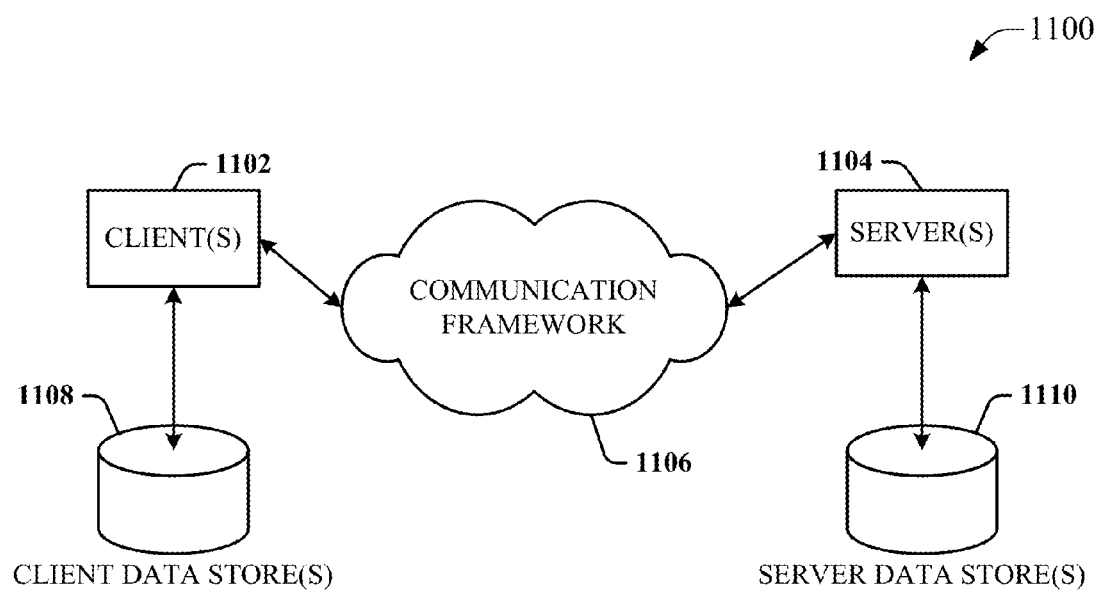
FIG. 11 is an example networking environment.

FIG. 11 is a schematic block diagram of a sample computing environment 1000 with which the disclosed subject matter can interact. The sample computing environment 1100 includes one or more client(s) 1110. The client(s) 1110 can be hardware and/or software (e.g., threads, processes, computing devices). The sample computing environment 1100 also includes one or more server(s) 1130. The server(s) 1130 can also be hardware and/or software (e.g., threads, processes, computing devices). The servers 1130 can house threads to perform transformations by employing one or more embodiments as described herein, for example. One possible communication between a client 1110 and a server 1130 can be in the form of a data packet adapted to be transmitted between two or more computer processes. The sample computing environment 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

The invention claimed is:

1. A system for routing messages to Manufacturing and Execution System (MES) applications, comprising:
  a gateway component configured to receive a message specifying a production objective, at least one constraint on performance of the production objective, and a time range during which the at least one constraint is in effect, the gateway component comprising:
    a parsing component configured to identify the production objective and the at least one constraint within the message;

an optimization component configured to select an MES application from a plurality of available MES applications according to a defined selection criterion based on the production objective, the at least one constraint, and the time range; and a message routing component configured to route the message to the MES application.

2. The system of claim 1, wherein the optimization component is further configured to select the MES application further based on one or more location tags identifying at least one of a control system, a plant facility, a production line, or a machine to be used to implement the production objective.

3. The system of claim 1, wherein the gateway component is configured to receive the message from an Enterprise Resource Planning (ERP) system.

4. The system of claim 3, wherein the gateway component is further configured to receive a status message from the MES application relating to execution of a workflow for satisfying the business objective, and to route the status message to the ERP system.

5. The system of claim 4, wherein the gateway component further comprises an outgoing transform component configured to convert a format of the status message to a format compatible with the ERP application.

6. The system of claim 3, wherein the gateway component is configured to receive the message via a manufacturing services bus, and to route the message to the MES application via the manufacturing services bus.

7. The system of claim 1, wherein the gateway component further comprises a transformation component configured to convert a format of the message to a format compatible with the MES application.

8. The system of claim 1, wherein the selection criterion comprises an instruction to satisfy the production objective using at least one of a most time efficient MES application, a most energy efficient MES application, or a most cost efficient MES application.

9. The system of claim 1, wherein the optimization component is further configured to select the MES application based in part on an analysis of current control system context information provided by the plurality of available MES applications, the current context information comprising at least one of a machine status, a machine availability information, a work schedule associated with a production line, a resource inventory status, an energy constraint at a facility, or a process capability.

10. The system of claim 9, further comprising a query component configured to send queries to the plurality of available MES applications requesting the current control system context information.

11. The system of claim 1, wherein the production objective is at least one of a production request, a customer order, or a resource allocation request, and the at least one constraint comprises at least one of an energy constraint, a resource constraint, or a product priority.

12. A method for directing messages to applications subscribed to a manufacturing services bus, comprising:

receiving, by a system comprising at least one processor, a message defining a production goal, one or more constraints on performance of the production goal, and a time range during which the one or more constraints are in effect;

identifying, by the system, the production goal, the one or more constraints, and the time range within the message;

selecting, by the system, a manufacturing and execution system (MES) application from a set of available MES applications subscribed to a manufacturing services bus according to a defined selection criterion based on the production goal, the one or more constraints, and the time range; and directing, by the system, the message to the MES application.

13. The method of claim 12, wherein the receiving comprises receiving the message from an Enterprise Resource Planning (ERP) system.

14. The method of claim 12, further comprising transforming, by the system, a data format of the message to conform to a protocol of the MES application prior to the directing.

15. The method of claim 12, further comprising identifying, by the system, one or more location tags that specify at least one of a control system, a plant facility, a production line, or a machine to be used to implement the production goal, wherein the selecting comprises selecting the MES application further based on the one or more location tags.

16. The method of claim 12, further comprising selecting the MES application according to a selection criterion defined for the manufacturing services bus.

17. The system of claim 16, wherein the selecting comprises selecting the MES application based in part on an analysis of respective capabilities and availabilities of the set of available MES applications.

18. A non-transitory computer-readable medium having stored thereon computer-executable instructions that, in response to execution, cause a computer system including a processor to perform operations, the operations comprising:

receiving, via a manufacturing services bus, a message conveying a manufacturing objective, at least one constraint to be placed on execution of the manufacturing objective, and a time range during which the at least one constraint is in effect;

selecting a manufacturing and execution system (MES) application, of a set of MES applications communicatively coupled to the manufacturing services bus, according to a defined selection criterion based on the manufacturing objective, the at least one constraint, and the time range contained in the message; and routing the message to the MES application via the manufacturing services bus.

19. The non-transitory computer-readable medium of claim 18, wherein the selecting comprises selecting the MES application further based on at least one of a capability or an availability of the MES application.

20. The non-transitory computer-readable medium of claim 18, wherein the routing comprises transforming a data format of the message to conform to a protocol of the MES application.

* * * * *